Figure 1:
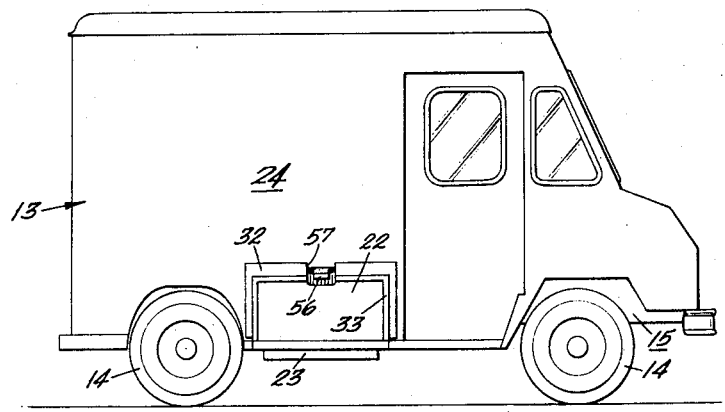

United States Patent [19]
Hafer

[11] 3,708,028
[45] Jan. 2, 1973

[54] ELECTRICALLY DRIVEN VEHICLES
[75] Inventor: Paul R. Hafer, Boyertown, Pa.
[73] Assignee: Boyertown Auto Body Works, Boyertown, Pa.
[22] Filed: Dec. 21, 1970
[21] Appl. No.: 99,750

[52] U.S. Cl. .................... 180/65 R, 104/34, 105/51
[51] Int. Cl. ............................................... B60k 1/00
[58] Field of Search ........ 180/65; 105/50, 51; 104/34

[56] References Cited

UNITED STATES PATENTS

| 1,209,962 | 12/1916 | Heath | 105/51 X |
| 1,309,164 | 7/1919 | Ward | 180/65 R |
| 1,335,243 | 3/1920 | Klingelsmith | 180/65 R X |
| 1,551,594 | 9/1925 | Walter | 180/65 R |
| 2,181,406 | 11/1939 | Madden | 105/51 X |
| 2,261,126 | 11/1941 | Morey et al. | 105/51 |

FOREIGN PATENTS OR APPLICATIONS

| 118,963 | 6/1947 | Sweden | 180/65 R |
| 514,501 | 11/1939 | Great Britain | 180/65 R |

Primary Examiner—Robert J. Spar
Attorney—Hyde W. Ballard

[57] ABSTRACT

This invention relates to improvements in electrically powered vehicles and more particularly to structure for effecting the quick changes of batteries in such vehicles together with improved features in the electric motor drive.

5 Claims, 11 Drawing Figures

PATENTED JAN 2 1973

3,708,028

SHEET 1 OF 5

INVENTOR.
PAUL R. HAFER
BY
Hyde W. Ballard
ATTY.

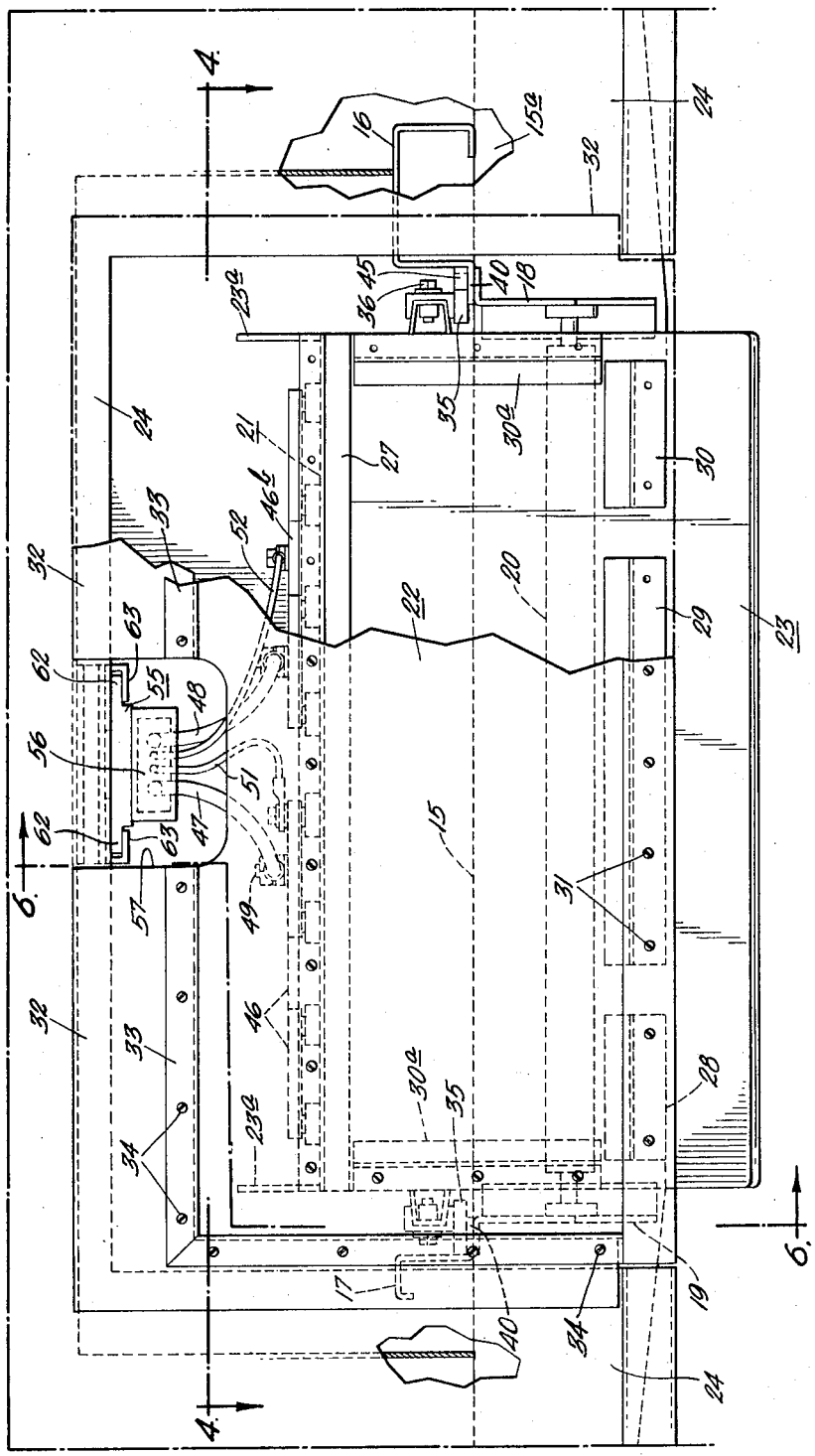

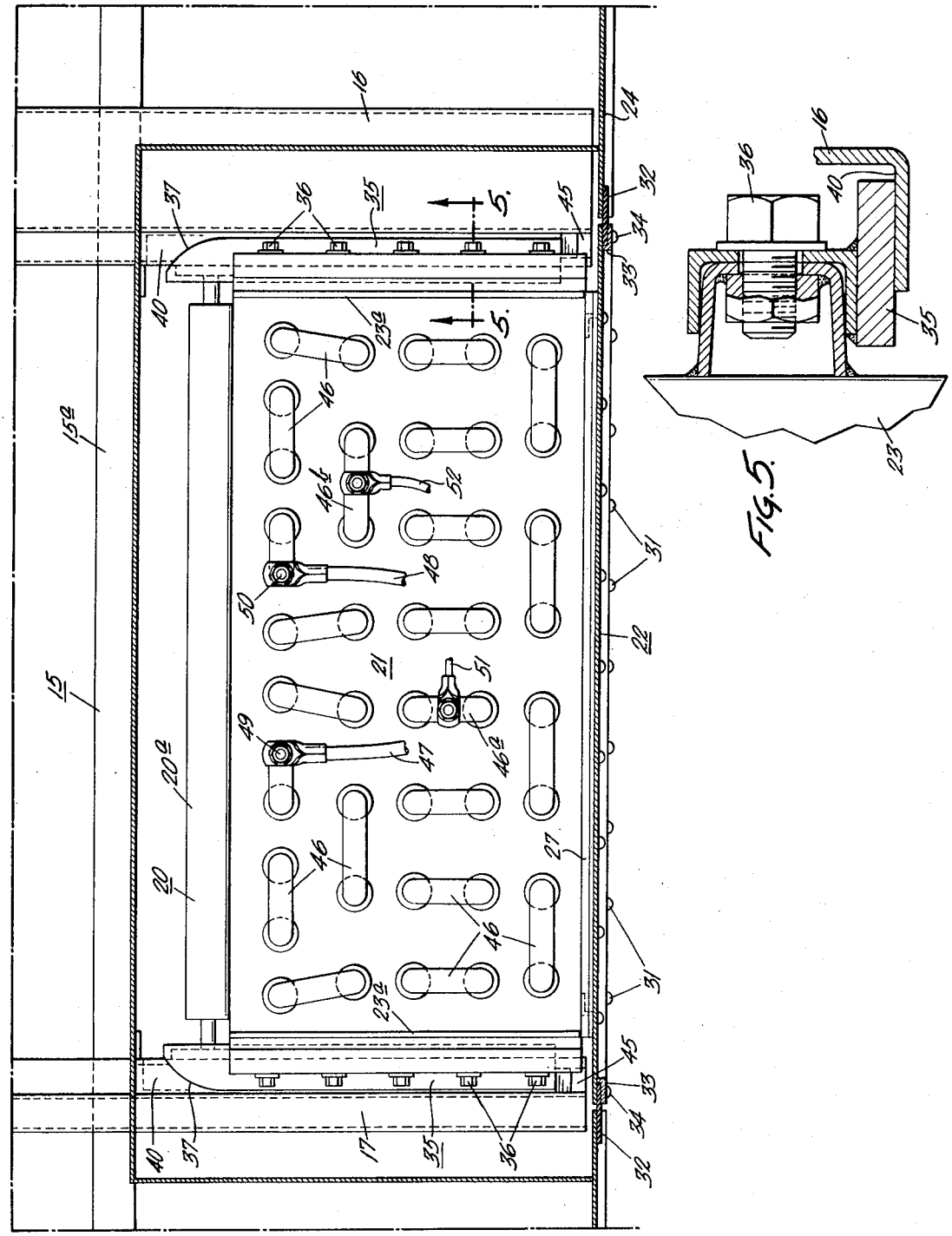

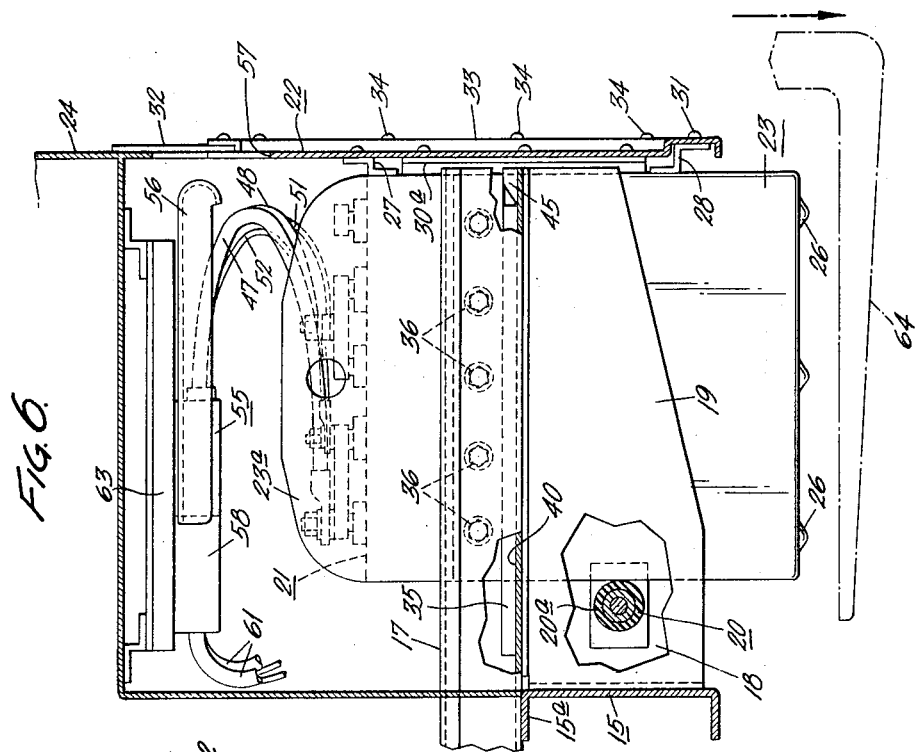
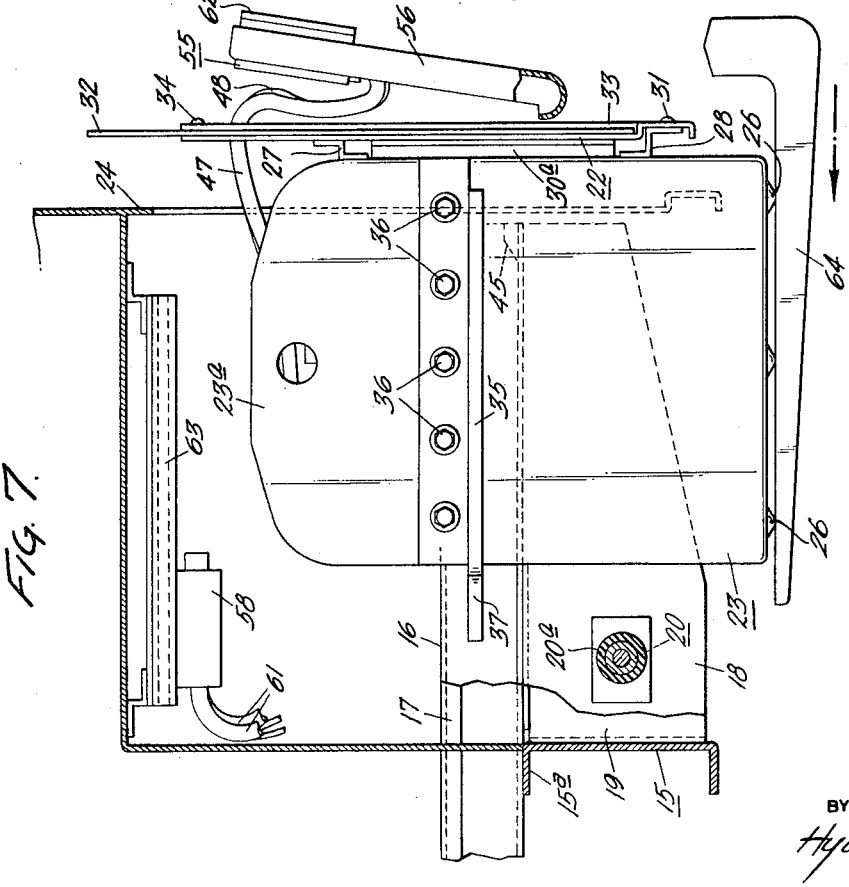

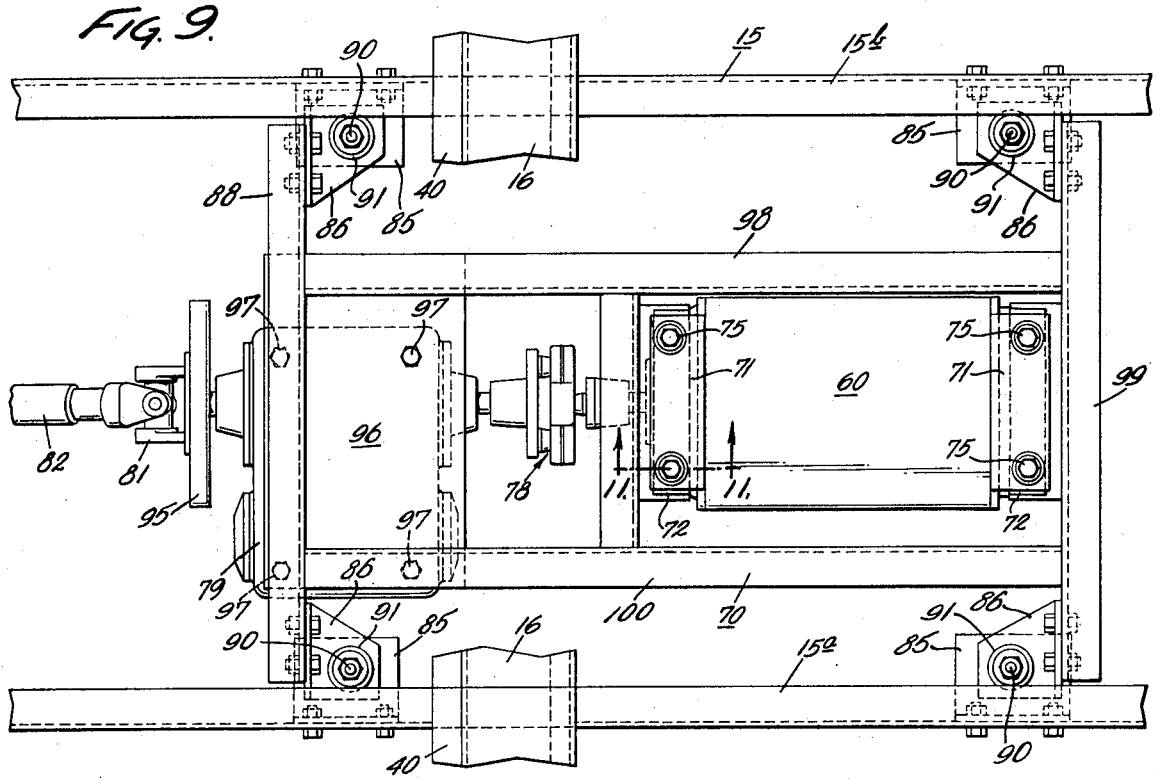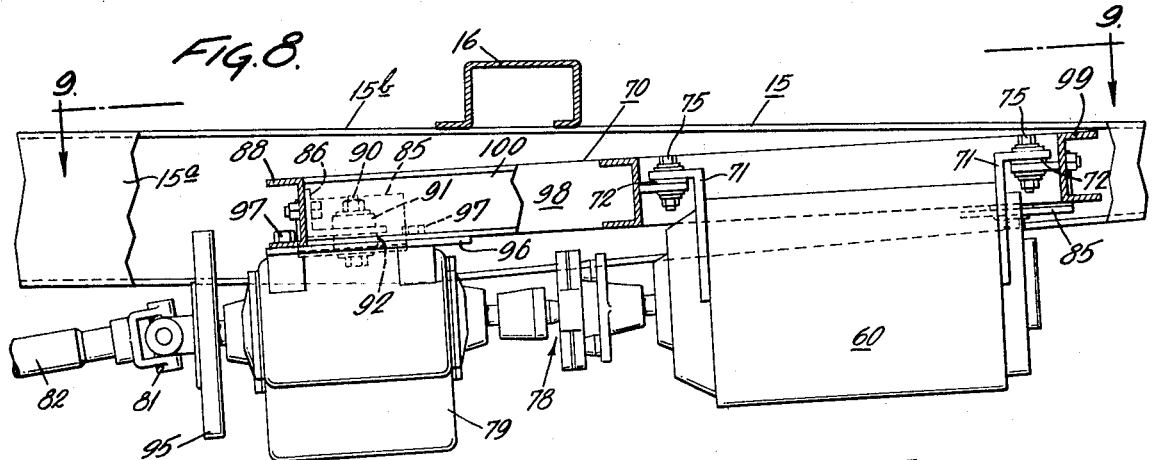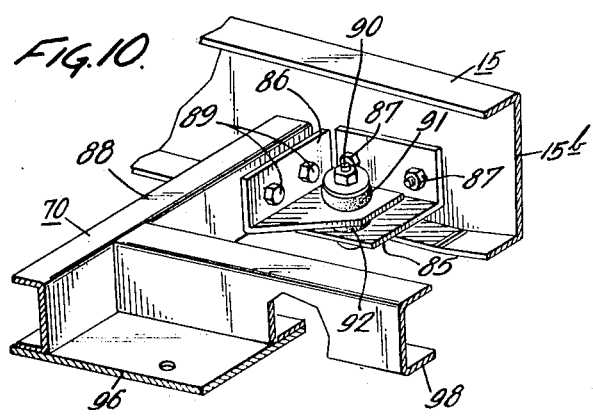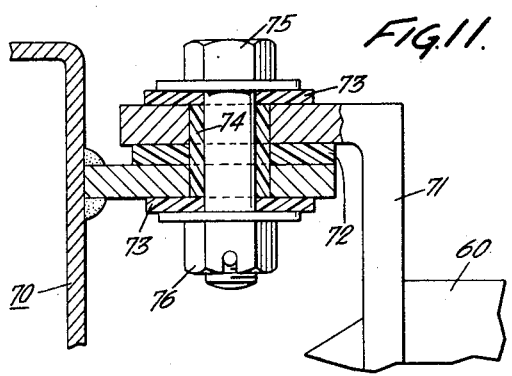

ELECTRICALLY DRIVEN VEHICLES

Although electrically powered self-propelled vehicles have been used and operated for many years, the excessive weight of the battery required, together with the necessity for frequent charging has severely limited the widespread acceptance of this type of vehicle. In the few instances where such vehicles have been found to be practical, the type of use has been for limited runs having many stops and/or where the vehicle never has to be driven any great distance from a charging station.

The present invention contemplates an improved commercial vehicle which can be kept in practically constant use simply by means of periodically replacing the batteries. Since the batteries for an electric commercial vehicle may weigh as much as 500 or 600 lbs., it has been a major operation to remove them for charging. It has required the vehicle to be out of use a period of time to properly recharge the batteries that remained installed in it. Ordinarily, the battery installation is carried inbetween the chassis or frame rails of the vehicle. This may mean in some instances that the body has to be removed in order to replace batteries or that they have to be lifted a vertical height sufficient to clear the frame rails by means of a chain hoist.

Obviously, the operation of replacing batteries quickly under these conditions is not feasible. By utilizing a saddle across the frame rails and suspending a battery at each side in a position outboard of the frame rails, it may readily be accessible for a quick change procedure thereby maintaining practically uninterrupted use of the vehicle.

It is, therefore, the primary object of the present invention to provide practical quick change battery installation for a commercial electric vehicle.

A further object of the invention is to provide a satisfactory battery carrier for an electric vehicle which permits the battery to be removed in a matter of seconds by means of a fork lift truck.

A further object of the invention is to provide an accessible battery and battery carrier for an electric vehicle which permits installation of a replacement battery in a matter of seconds from the side and which has suitable means for preventing accidental removal of the battery.

A further object of the invention is to provide improved mounting means for the drive elements in a commercial electric vehicle.

Further objects will be apparent from the specification and drawings in which

Figure 2:
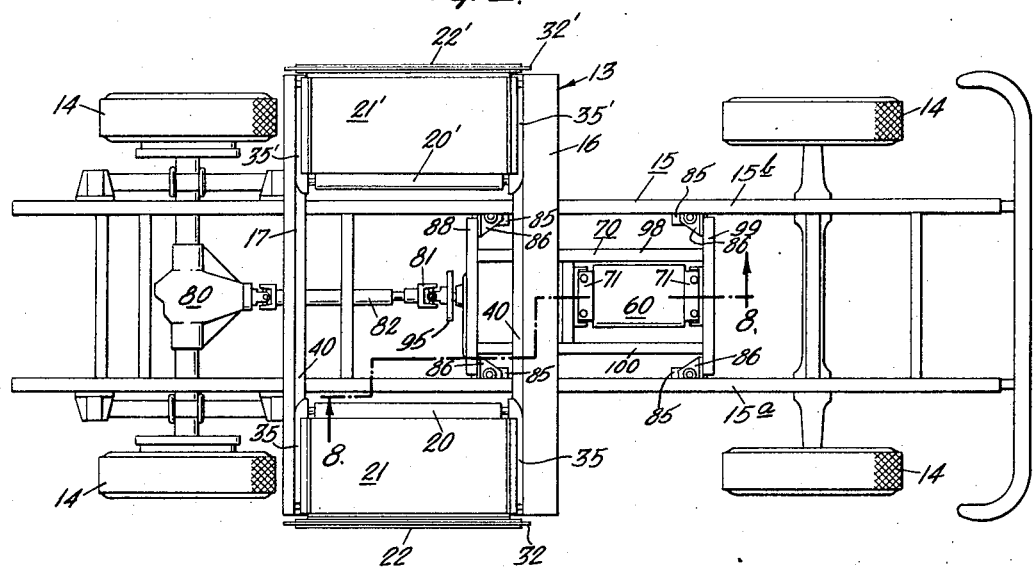

FIG. 1 is a side view showing a commercial vehicle of the van type equipped with the present invention, FIG. 2 is a top view of the vehicle of FIG. 1 with the body removed, FIG. 3 is an enlarged detail partly broken away of one of the two battery compartments in the vehicle of FIG. 2, FIG. 4 is a top view of the structure of FIG. 3 as seen at the lines 4—4, FIG. 5 is an enlarged sectional detail of one of the battery case skids as seen at 5—5 of FIG. 4, FIG. 6 is a section as seen at 6—6 of FIG. 3, FIG. 7 is a view similar to FIG. 6 with the rear gusset plate broken away showing the battery and its case partly removed from the vehicle, FIG. 8 is a sectional detail as seen at 8—8 of FIG. 2, FIG. 9 is a top view of the structure of FIG. 8 as seen at 9—9, FIG. 10 is a fragmentary perspective showing one of the mounting means for the electric motor, FIG. 11 is an enlarged sectional detail as seen at 11—11 of FIG. 9.

Referring now more particularly to the drawings, an electrically powered vehicle such as the van 13 shown in FIG. 1 is provided with the usual wheels 14, frame 15 and other conventional items of the chassis as may be seen in FIG. 2. At a location approximately at the center of gravity of the vehicle, a front cross member 16 is secured to the top of frame 15 and a rear cross member 17 is secured to the top of frame 15 in spaced relation to member 16. Cross members 16 and 17 extend laterally to a point approximately in line with the side of the body with which the vehicle is equipped. It will be understood that the present invention is directed primarily to a light commercial delivery vehicle with a van body such as shown in FIG. 1, but it is equally applicable to any other type of vehicle including a bus, pick-up truck or passenger vehicle.

Referring now to FIGS. 2 and 3, gusset plates 18 and 19 are welded to the lateral rails 16 and 17 and to frame rails 15a. Bumpers 20, 20' extend fore and aft between the plates 18, 19 and are positioned in spaced relation to the frame members 15a and 15b. This spacing is so calculated that when the battery 21 is in position, the face plate 22 fastened to the battery case 21 is substantially flush with the side 24 of the vehicle body (FIG. 4.) Bumpers 20, 20' are rotatable and are provided with a rubber tube or sleeve 20a (FIGS. 6 and 7) to prevent damage to the battery case and also to provide a resilient cushion to hold the battery in place during operation of the vehicle.

The battery proper 21 is permanently set in a battery case or carrier 23 having a series of ridges 26 on the bottom thereof for reinforcement and to which the face plate or cover 22 is attached with a Z channel 27 along the top, a series of interrupted Z channels 28, 29 and 30 along the bottom, and vertical Z channels 30a, 30a at the ends. Channels 27–30a are secured to the face plate 22 with screws 31, 31. The face plate 22 is spaced from the battery case 23 and there is sufficient end clearance between channels 28, 29, 30 to provide adequate air circulation around the battery. A peripheral sealing gasket 32 closes the aperture between the plate 22 and the side 24 of the vehicle body to protect against splashing and to provide adequate air circulation. Gasket 32 is held in position on face plate 22 by molding 33 and screws 34, 34. Each end of the battery case 23 is provided with a skid angle assembly 35 attached to the case by a series of bolts 36, 36 and having an arcuate forward terminus 37 which extends beyond the inner side of battery 21. This arcuate edge 37 guides a replacement battery into the vehicle and compensates for minor misalignment if the operator fails to center the battery exactly between the cross members 16 and 17.

Referring now to FIG. 5, the skids 35 slide on horizontally extending ways 40, 40 formed by the lower flanges of cross members 16 and 17. A detail of the rear skid is simply an allochiral view of FIG. 5 so that a description of one suffices for both. Furthermore, it will be understood that the description of the right side battery and related supporting structure shown in FIGS. 3–7 applies equally to the battery and on the opposite side of the vehicle since each vehicle utilizes two batteries, one on each side. The corresponding reference numbers for the left side are primed.

To insure that the battery 21 remains seated in position, I provide a wedge 45 (FIG. 6) at the outer terminus of each way 40 so that each skid 35 seats inside and below the wedges 45, 45. If desired, the wedges may be provided with tapered edges to prevent damage in the event that the operator should withdraw the battery and case before it is elevated sufficiently to clear both wedges.

As is customary in the construction of heavy duty batteries, the top of the battery is provided with a series of connectors 46, 46 (FIG. 4) for joining the individual battery cells in the well known manner. The main 42 volt output leads 47 and 48 are connected to terminal posts 49 and 50 respectively. The 12 volt or low voltage output leads 51 and 52 are secured to connectors 46a and 46b. To insure that none of the terminals 46, 49 or 50 comes in contact with any part of the vehicle frame or body during removal or insertion of the battery, I extend the sides 23a, 23a of the battery case 23 well above the highest terminal (FIG. 6) to act as guards should the fork lift operator raise the battery too high. Leads 47, 48, 51 and 52 are carried to a junction block 55 to which is secured a cupped handle 56 extending to a point just inside the cover plate 22 where it is accessible to the operator through an aperture 57 in the plate 22. This enables the mechanic to remove the junction block 55 from its mating block 58 prior to removal of the battery and also permits the operator in a matter of seconds to connect the block 55 upon the insertion of a new battery. Leads 47 and 48 are the main leads for supplying power to the motor 60 through a suitable controller, not shown, and leads 61, 61. Junction block 55 is provided with side flanges 62, 62 which travel in the rails 63, 63 (FIG. 3) thus permitting ready removal and insertion of the junction block and insuring proper alignment of the terminals in the mating junction block 58.

In operation, to effect a quick battery change, it is only necessary for an operator with a fork lift truck having a vertically moveable fork 64 to insert the fork under the battery case, pull the junction box handle 56 to disconnect the junction block and position it as shown in FIG. 7. The operator then merely elevates the fork 64 a few inches and withdraws the battery and case from the vehicle and then transports it to a convenient charging station. Recharged batteries are reinserted in the vehicle in precisely the same manner but reversing the sequence of operations.

Referring now to FIGS. 8-10, the motor 60 in my improved electric vehicle is mounted on frame 15 by a cradle or subframe assembly 70 from which the motor is suspended on hangers 71, 71 mounted on fiber plates 72, 72. The motor is completely dielectrically mounted on the subframe by means of insulating washers 73, 73 and insulating bushings 74, 74. The motor 60 is secured by means of four bolts 75, 75 and nuts 76, 76. The drive from motor 60 is through an insulated universal coupling 78 and gear box 79. Final drive to the differential 80 and wheels 14, 14 is through universal joint 81 and driveshaft 82. Subframe 70 is resiliently mounted on the frame 15 through four elastomeric connections which are shown in FIGS. 9 and 10. Each connection comprises a pair of angle brackets 85 and 86, the former being bolted to frame members 15a and 15b by means of bolts 87, 87 and to cross members 88 and 99 by means of bolts 89, 89. A through bolt 90 extends vertically through both brackets 85 and 86 and is insulated from the brackets by means of compressible pancake washers 91 and 92. This construction provides a resilient shock free mounting for the entire subframe assembly 70 which in turn carries the motor 60 and the transmission 79. A suitable brake drum or brake disc 95 is placed in the drive line between universal joint 81 and gear box 79. Also shown in FIG. 10 is the plate mounting 96 from which the gear box 79 is suspended by bolts 97, 97. The plate 96 is welded to the subframe members 88, 98 and 100 which together with the forward subframe member 99 comprise a unitary rigid subframe weldment.

The improved location of the batteries in accordance with the present invention permits the electric motor to be mounted in the optimum position close to the center of gravity of the vehicle and with a short driveshaft. The resilient and electrically insulated cradle mounting for the motor absorbs shock due to starting torque and safeguards against a short circuit due to any grounding of the motor on the vehicle frame.

The battery case is fabricated of a high strength material such as steel with reinforcing corrugations on the bottom to prevent damage during the changing operation. Furthermore, this construction makes it highly desirable to provide adequate cooling for the batteries and, therefore, the battery is exposed to cooling air on all surfaces including the outer vertical side due to the spacing of the cover and its mounting on the battery case with means for providing adequate air circulation therebetween. Normally, the battery merely rests on the ways with little or no actual sliding motion. However, it will be understood that the invention is not limited to this particular detail but would include a removable retaining device which might permit removal and insertion of the battery with more or less slidable support being provided by the ways.

The present invention utilizes a cheap and practical means for utilizing electric vehicles and particularly commercial vehicles to the maximum capacity. This feature is of prime importance in the case of a commercial vehicle where it must compete with other types of propulsion that do not require substantial down time for servicing or recharging the batteries.

Having thus described my invention,

I claim:

1. In a self-propelled electric vehicle having a frame, driving wheels, an electric motor operatively connected to said driving wheels, a heavy duty battery, an electrical connection from the battery to the motor, the improvement of a pair of longitudinally spaced supports for said battery mounted on said frame, said supports extending laterally outwardly and away from said frame, a reinforced case for said battery, bracket means secured to each end of said case for supporting said case and the battery held thereby on said pair of laterally extending supports when the battery is in operative position a bumper secured to the vehicle frame against which the battery case rests when in operative position, a fixed stop on each of said supports in laterally spaced relation to the bumper permitting vertical movement of said battery case relative to said support to permit removal of said battery but preventing horizontal movement of said battery case relative to said support at all other times.

2. A vehicle constructed in accordance with claim 1 having a face plate secured to the outward side of the battery in spaced relation thereto to provide an air circulating space between the battery case and the face plate.

3. A vehicle constructed in accordance with claim 1 in which the bumper resiliently positions the battery on the support to prevent movement thereon.

4. A vehicle constructed in accordance with claim 1 having a push-pull connecting junction box for the electrical connections.

5. Apparatus in accordance with claim 1 in which said stops are provided with inclined innerfacing surfaces.

* * * * *